Jan. 23, 1968   J. S. THOMPSON ET AL   3,365,524
METHOD FOR MAKING AND TESTING A MOLD
FOR A BACKLIT PROJECTION SCREEN
Filed April 14, 1966

POUL B. ROULUND
JAMES S. THOMPSON
INVENTORS

BY *Allen E. Botney*

ATTORNEY

United States Patent Office 3,365,524
Patented Jan. 23, 1968

3,365,524
METHOD FOR MAKING AND TESTING A MOLD FOR A BACKLIT PROJECTION SCREEN
James S. Thompson, Los Angeles, and Poul B. Roulund, Redondo Beach, Calif., assignors to FMA, Inc., Los Angeles, Calif., a corporation of California
Continuation-in-part of application Ser. No. 267,673, Mar. 25, 1963. This application Apr. 14, 1966, Ser. No. 549,101
7 Claims. (Cl. 264—40)

ABSTRACT OF THE DISCLOSURE

A method of forming an undulating surface comprising the steps of coating a base with a layer of adhesive, partially imbedding a layer of spherical beads in the adhesive, and depositing a film of material over the layer of beads of such thickness that the interstices between adjacent beads are filled in while the spherical contours of the beads are preserved. Steps are also disclosed for checking the application of beads to the adhesive by placing the surface of the beads in the path of a directional light source. When the beads are sufficiently imbedded in the adhesive, the light source ceases to produce a spot in the shape of the source on the other surface of the base. When the density and uniformity of the layer of beads is satisfactory, telltale marks cease to appear on the other surface of the base.

---

This application is a continuation-in-part of our copending application, Ser. No. 267,673, filed Mar. 25, 1963, now abandoned.

The present invention relates in general to improvements in viewing screens and, more particularly, relates to a new method for making a backlit projection screen.

Screens made in accordance with the present invention may be used in any viewing system in which an image is projected on one side of the screen and viewed from the opposite side. In using projection screens of the kind mentioned, it will at once be recognized that it is desirable to minimize as much as possible reflection and dispersal of the projected light and thereby transmit a maximum amount of this light in a forward direction only, that is to say, toward the viewer, since, by substantially eliminating back scattering of the light, the micro-contrast of the image is very greatly improved, which means that a much sharper image is produced.

The scattering in a forward direction only of light projected onto the screen from the rear is achieved by means of a layer of tiny randomly distributed substantially hemispherical lenses on one face of the screen. The surface of the screen having these minute lenticular protuberances thereon is the projection surface, the picture or light image being projected onto the viewing surface through the screen from the rear. The quality of the screen as a whole depends, among other things, on the quality of the lenticular array in particular and this, in turn, depends on the technique employed in fabricating the mold from which the screen itself is ultimately made. The essence of the invention lies in the discovery of a method of making a mold that will not only permanently record the fine detail required for screens of this type, and that can be used over and over again without loss of such detail, but one that also rounds off interstices between lenses.

The novel features which are believed to be characteristic of the invention, together with further objects and advantages thereof, will be better understood from the following description considered in connection with the accompanying drawings in which a method and the apparatus therefore are illustrated by way of example. It is to be expressly understood, however, that the drawing is for the purpose of illustration and description only and is not intended as a definition of the limits of the invention.

Figure 1:
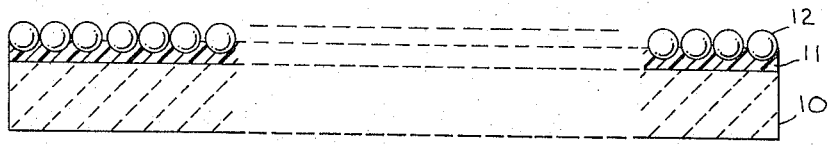
FIG. 1 is an illustration that can be used to explain the first few steps involved in the process of the present invention.

Referring now to the drawings and in particular to FIG. 1 therein, a transparent base material 10 such as Lucite, Plexiglas, or plain glass, is dipped into a bath of a transparent adhesive substance, such as, for example, a silicone potting compound, an example of which is the substance known by its trade name of LTV–602 manufactured by the Silicone Products Department of the General Electric Company, Waterford, N.Y. LTV–602, which will be used in the description that follows, is one of a series of low-temperature curing compounds that cures with the addition of a catalyst to form a completely transparent, resilient solid. Having dipped base material 10 into the LTV–602 bath, the excess of this LTV substance is permitted to run off until a very thin, even coat 11 of it remains on the surface of the base. The abovesaid coated structure is then partially cured, either at room temperature for several hours, for example, six hours, or in an oven maintained at 150° Fahrenheit for approximately twenty minutes, until the LTV coating is in a tacky state. It should be mentioned here that the LTV coating may be applied to base 10 in a manner other than by dipping. More specifically, the LTV–602 mixture can be applied by simply pouring it over the surface of the base. Base 10 is then tilted at an angle so that all excess LTV will run off and thereby leave a uniform coating of it.

It should also be mentioned that it is important to de-gas the LTV–602 mixture before it is applied to base 10 in order to get rid of any air bubbles that might be trapped in it. De-gassing is accomplished by placing the LTV in a vacuum chamber and letting the air "boil" off. Unless this is done, the process may result in a screen surface of somewhat inferior quality. It is advisable to de-gas the LTV again after it has been coated onto the base since it is always possible that air may have been trapped in it during its application to the base. Here again, the de-gassing is accomplished by placing the coated base in a vacuum chamber and is kept there until all air bubbles that may have been trapped are boiled off, that is to say, until no more air bubbles are seen bursting at the surface of the LTV–602 coating. The coated base is then taken out of the vacuum chamber, and cured for approximately 6 hours at room temperature.

At this time and with the aid of an ordinary paint brush, tiny glass beads or balls, which may be either hollow or solid, are brushed onto the surface of LTV–602 coating 11, and because of its tacky state, the beads will become half-immersed in it, that is to say, the beads will sink into the coating to a depth substantially equal to their radii. With sufficient brushing, a layer of beads 12 is formed on and completely covers the surface of the coating. With respect to the tiny glass beads or balls mentioned, the beads may be purchased with diameters down to a micron but the diameter of the beads actually used depends upon the resolution desired for the projection screen fabricated, the resolution being inversely proportional to the size of the beads. In general, beads smaller than 100 microns in diameter are necessary to produce screens with commercially acceptable resolution. Thus, for example, to obtain an extremely high resolution screen of 160 lines per millimeter, beads of about six to eight microns in diameter would be used. As stated earlier, the beads may be solid or hollow, the solid beads being somewhat easier to handle. Beads of the type mentioned are commercially available, the solid beads being manufactured and sold by Micro-beads, Inc., of Jackson, Miss., and the hollow beads being manufactured and sold by Emerson & Cuming, Inc., 869 Washington St., Canton, Mass.

The beads are first brushed onto adhesive coating 11 and then checked visually by projecting light from a directional source upon the surface of beads 12 and simultaneously looking through the structure of FIG. 1 toward the directional light source from the bottom side of base 10. Two characteristics of the imbedded beads are checked. The first is the depth of the immersion. If the beads are not deeply enough imbedded in coating 11, i.e. about half-immersed, the light incident upon the beads is directly transmitted through the structure instead of being diffused. This condition is observed by the viewer as a spot of light on the bottom side of base 10 about the size of the incident light from the source. The brushing step is repeated until the visual check indicates that the beads are about half immersed in coating 11, at which point incident light diffuses and appears uniformally over the entire bottom side of base 10. The second characteristic is the density and uniformity of the layer of beads. If the beads are not applied with the required density and uniformity, small tell-tale marks are observed by the viewer where light is transmitted directly through the structure between the beads. Beads are repeatedly brushed onto coating 11 until all the tell-tale marks also disappear, indicating that the proper density and uniformity of beads has been achieved.

In curing this combination, it is preferably left at room temperature until (1) layer 11 becomes quite hard, thereby firmly or rigidly holding in place beads 12 that are half-imbedded in it, and (2) LTV-602 layer 11 is quite dried out, or else there may be a discoloring of the aluminum layer that will later be deposited over the beads due to a chemical reaction between the aluminum and the catalyst in the LTV. By doing a thorough job of curing the LTV layer, for example, by curing it at room temperature for two or more days, the possibility of a reaction and the consequent discoloring is avoided. Of course, the needed curing may be expedited by placing the combination in an oven maintained at higher than room temperature, for example, at 150° Fahrenheit.

The next step in the process is very important. The step consists of depositing a thin film or coating of a material, preferably a metal, over the layer of beads 12 by evaporation in a vacuum. Aluminum is especially well-suited because it is relatively inexpensive, deposits easily, and in general produces very satisfactory results. An aluminum film, designated 13, is shown deposited over the layer of beads 12 in FIG. 2. Deposition of film 13 by evaporation in a vacuum is employed because this technique allows exercise of sufficient control over the thickness of the film to carry out the invention satisfactorily. The step of deposition by evaporation in a vacuum involves placing the structure of FIG. 1 in a vacuum chamber in the presence of an aluminum rod and heating the rod. Some of the aluminum is evaporated off and becomes deposited on the surface of beads 12. The thickness of the layer of aluminum is critical in view of the small size of the beads. Deposition by evaporation of the aluminum is continued until film 13 is thick enough so that the interstices between adjacent beads and the sharp points created at the points of contact of contiguous beads are filled in, while being thin enough so that the spherical contours of the beads, i.e. the crests, are accurately preserved on the surface of film 13. As a result of the deposition of aluminum of this controlled thickness, film 13 has an undulating surface that functions generally as adjacent concave and convex spherical lens of two different sizes.

The importance of film 13 is twofold. First, it enters the interstices or spaces between the beads and thereby covers up those portions of the LTV-602 layer beneath the beads that are exposed through these crevices or spaces. In other words, by depositing film 13, a very thin metal sheet is formed over beads 12 that follows the spherical contours of the beads faithfully and, at the same time rounds off the corners formed by the beads lying contiguous to one another. Second, film 13 provides a barrier between beads 12 and coating 11, on the one hand, and a mold on the other hand. A suitable material that will release from beads 12, coating 11, and the molding substance must be selected. Aluminum is such a material. As a release layer, however, film 13 distinguishes from the release layers known in the past, since it is of controlled thickness to produce the undulating surface described in the preceding paragraph and its surface is preserved after removal of the mold.

Figure 2:
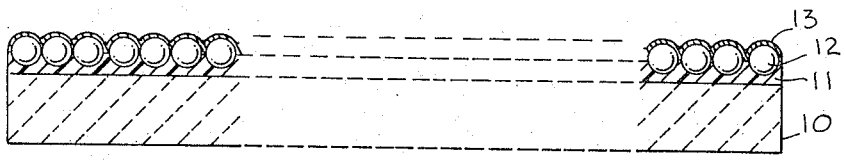
FIG. 2 shows the FIG. 1 structure with an additional coating deposited over it.
Figure 3:
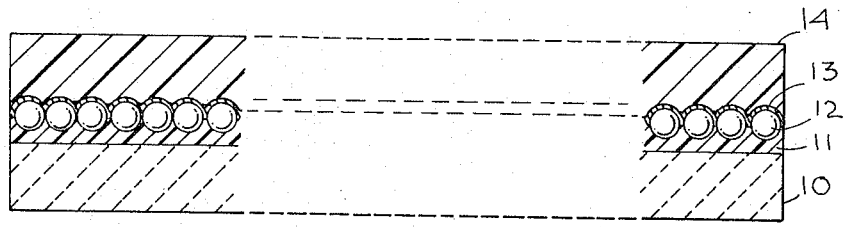
FIG. 3 shows the FIG. 2 apparatus, but with the addition of a layer of mold material over the abovesaid coating.

Once the metal film is of the proper thickness, as described above, its surface forms a master from which a mold is constructed. This master is represented in FIG. 2. flexible mold material in liquid form is poured over this master, the mold material then being allowed to harden by means of the curing process, either at room temperature or in an oven, to form layer 14 in FIG. 3. One desirable mold material is a silicone rubber compound, an example of which is the compound known as RTV-60 which is produced and sold by General Electric, Silicone Products Department, Waterford, N.Y. RTV-60 cures to a strong, durable, resilient silicone rubber and molds made of this material easily release plastics, even epoxies, without a release agent. RTV-60 is also a desirable material because its low shrinkage insures accurate reproductions. In curing the combination after the RTV-60 material has been poured over bead layer 12, best results can be obtained by curing for about twelve hours at room temperature. As before, however, the curing process can be expedited by curing at higher temperatures, for example, at 150° Fahrenheit for two to three hours. After the RTV-60 material has been cured, it is hard but flexible and in that respect resembles a hard sheet of rubber.

Although RTV-60 is preferred as a mold material, various other materials can nevertheless be used instead of RTV-60 since the physical properties required for a material are (1) that it have the ability to take an accurate cast of the surface on which it is poured or deposited, in this case, metal film 13 having the contours of bead layer 12 beneath it; (2) toughness to resist physical stress, such as abrasion, pulling, bending, etc., and environmental conditions, such as heat, light, etc.; and (3) the ability to have an epoxy cast or other clear plastic cast taken of its surface and released from these substances. Examples of materials other than RTV-60 that may be used are vinyl plastisol, polypropylene, the material known as Epolene manufactured and sold by Eastman Kodak, Rochester, N.Y., and the like.

Figure 4:
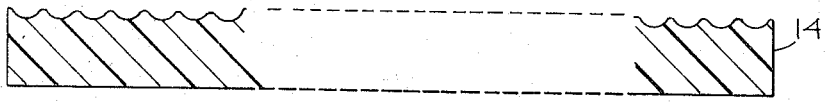
FIG. 4 is a representation of a mold from which the backlit projection screens will be made.
Figure 5:
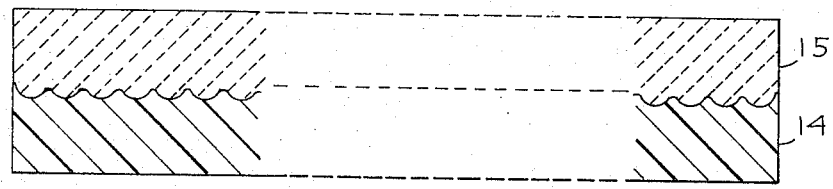
FIG. 5 illustrates the manner in which the mold is used to fabricate a backlit projection screen of the type under discussion.
Figure 6:
FIG. 6 is an illustration of a backlit projection screen made from the FIG. 4 mold and shows its lenticular surface structure.

Once the mold material has hardened, it is removed from layer 13 and this can be done simply by pulling layer 14 off of it. The removed mold is shown in FIG. 4 and, as shown, the surface of the mold material that was in contact with layer 13 is completely covered with randomly distributed hemispherical recesses. To fabricate a backlit projection screen of the kind herein involved, the surface of the mold that contains the above said hemispherical recesses is then covered with a clear epoxy or other clear plastic material, such as methyl methacrylate. In due time, the epoxy or other plastic material will harden to form layer 15 shown in FIG. 5. More particularly, the combination of mold 14 and epoxy 15 is cured, preferably for from twenty-four to forty-eight hours at room temperature, depending on the type of epoxy mixture used. In other words, a slow cure is preferred but not absolutely essential. When layer 15 has been cured to the desired hardness, it is stripped off master mold 14 to provide the desired backlit projection screen, as is shown in FIG. 6. It will be noticed that one surface of this screen is completely covered with randomly distributed hemispherical protuberances, this being the surface that was in intimate contact with the surface of the mold containing the hemispherical recesses. These hemispherical protuberances act as lenses and have the effect of projecting the light forward.

Once screen 15 has been stripped from mold 14, the mold then becomes available for the production of as many additional screens as may be desired, all having the same fine quality as the original screen. Thus, mold 14, once made, can be used indefinitely. It is thus seen that a number of such molds can be used for the manufacture of screens in commercial quantities.

It should also be mentioned once again that because aluminum layer 13 is deposited in controlled thickness on the beads, the crevices or dovetail spaces between the beads are slightly filled in so that there are no longer any complete hemispheres. Because of it, it has been found that a much higher-gain screen is produced.

Although a particular method has been described above for fabricating a mold from which, in turn, a backlit projection screen of the type involved here can be produced, the invention should be considered to include any and all modifications of the steps in said method, some of which have been mentioned in the body of the application, falling within the scope of the annexed claims.

We claim:
1. The method of fabricating a master for a projection screen mold comprising the steps of: coating a base with a layer of adhesive material; partially imbedding a layer of spherical beads in the layer of adhesive material; curing until the adhesive material sets sufficiently to hold the beads in place; and depositing a film of a material on the surface of the beads, the film being thick enough so that the interstices between adjacent beads are filled in and thin enough so that the spherical contours of the crests of the beads are preserved to produce an undulating surface.

2. The method of fabricating a mold of a projection screen comprising the steps of: coating a substrate with a layer of adhesive material; brushing a layer of spherical beads into the layer of adhesive material, the beads having a diameter less than 100 microns; permitting the adhesive material to harden sufficiently to hold the beads in place rigidly; depositing a thin film of metal over the layer of beads by evaporation in a vacuum until the thickness of the film is such that the surface of the film represents the spherical contour of the crests of the beads accurately, while being rounded off at the interstices between adjacent beads; and making a mold of the surface of the deposited film.

3. The method of claim 2, in which the metal is aluminum.

4. The method of checking the application of beads on a surface for the purpose of forming a projection screen comprising the steps of: coating one surface of a transparent base with a layer of transparent adhesive material; partially imbedding spherical beads in the layer of adhesive material; placing the surface of the imbedded spherical beads in the path of a directional light source; and imbedding the beads into the layer until the light source ceases to produce a spot in the shape of the source on the other surface of the base.

5. The method of claim 4, in which the beads are continuously applied to the adhesive layer until their density and uniformity is such that light transmitted between beads ceases to appear on the other surface of the base as tell-tale marks.

6. The method of fabricating a projection screen mold comprising the steps of: coating a base with a layer of adhesive material; partially imbedding a layer of spherical beads in the layer of adhesive material; curing until the adhesive material sets sufficiently to hold the beads in place; depositing a film of a material on the surface of the beads, the film being thick enough so that the interstices between adjacent beads are filled in and thin enough so that the spherical contours of the crests of the beads are preserved to produce an undulating surface; placing over the film a fluid substance that will harden into a resilient solid; curing until the fluid substance hardens into a resilient solid; and separating the resilient solid from the film beneath it to produce a mold.

7. The method of claim 6, in which the film is a material having the characteristic that it is releasable from the resilient solid.

References Cited
UNITED STATES PATENTS

| | | | |
|---|---|---|---|
| 2,143,946 | 1/1939 | Hunter | 264—1 |
| 2,218,909 | 10/1940 | Gill | 264—1 |
| 2,332,674 | 10/1943 | Smith | 264—1 |
| 2,378,252 | 6/1945 | Staehle et al. | 264—69 |
| 3,164,645 | 1/1965 | De Uries et al. | 264—1 |
| 3,187,068 | 1/1965 | De Uries et al. | 264—1 |
| 3,198,670 | 6/1965 | Robison | 264—1 |
| 3,218,186 | 11/1965 | De Uries et al. | 264—1 |

DONALD J. ARNOLD, *Primary Examiner.*

A. H. KOECKERT, *Assistant Examiner.*